(12) United States Patent
Sena et al.

(10) Patent No.: US 10,902,669 B2
(45) Date of Patent: Jan. 26, 2021

(54) METHOD FOR ESTIMATING LIGHT FOR AUGMENTED REALITY AND ELECTRONIC DEVICE THEREOF

(71) Applicant: Samsung Electronics Co., Ltd., Suwon-si (KR)

(72) Inventors: David Bernardino Martins Sena, Staines (GB); Nikolaos Papadopoulos, Staines (GB); Angelos Gkountis, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/409,083

(22) Filed: May 10, 2019

(65) Prior Publication Data

US 2019/0347848 A1  Nov. 14, 2019

(30) Foreign Application Priority Data

May 10, 2018  (GR) .............................. 20180100194
Jan. 16, 2019  (GB) .................................. 1900608.9

(51) Int. Cl.
*G06T 15/50* (2011.01)
*G06T 19/00* (2011.01)
(Continued)

(52) U.S. Cl.
CPC ............ *G06T 15/506* (2013.01); *G06T 5/006* (2013.01); *G06T 15/04* (2013.01); *G06T 15/60* (2013.01);
(Continued)

(58) Field of Classification Search
CPC ............................. G06T 15/506; G06T 19/006
(Continued)

(56) References Cited

U.S. PATENT DOCUMENTS 8,797,321 B1  8/2014  Bertolami et al.
9,578,226 B2  2/2017  Gruber et al.
(Continued)

FOREIGN PATENT DOCUMENTS

| CN | 101710429 A | 5/2010 |
| KR | 10-1650177 B1 | 9/2016 |
| WO | 2017/166705 A1 | 10/2017 |

OTHER PUBLICATIONS

Great Britain Office Action dated Jul. 12, 2019, issued in Intellectual Property Office Application No. GB1900608.9.
(Continued)

*Primary Examiner* — Shivang I Patel
(74) *Attorney, Agent, or Firm* — Jefferson IP Law, LLP

(57) ABSTRACT

A method for operating an electronic device for rendering an augmented reality object is provided. The method includes obtaining at least one first image of an environment in which an augmented reality virtual object is to be displayed, obtaining an environment texture based on the obtained at least one first image, identifying at least one light source in at least one second image by identifying at least one cluster comprising pixels with a brightness value greater than a threshold, determining a position of the at least one light source based on a position of the pixels within the at least one cluster, rendering the augmented reality virtual object based on the obtained environment texture and the determined position of the at least one light source, and displaying the rendered augmented reality virtual object on a display of the electronic device.

20 Claims, 11 Drawing Sheets

(51) Int. Cl.
*G06T 5/00* (2006.01)
*G06T 15/60* (2006.01)
*G06T 15/04* (2011.01)

(52) U.S. Cl.
CPC ........ *G06T 19/006* (2013.01); *G06T 2200/04* (2013.01)

(58) Field of Classification Search
USPC .......................................................... 345/426
See application file for complete search history.

(56) References Cited

U.S. PATENT DOCUMENTS 9,716,842 B1 7/2017 Worley et al.
2013/0271625 A1* 10/2013 Gruber ............... G06K 9/00671
348/239
2016/0044251 A1 2/2016 Wong et al.
2016/0086379 A1* 3/2016 Sadi ........................ G06F 3/005
345/633
2017/0161939 A1 6/2017 Sugden et al.
2019/0012828 A1 1/2019 Jung et al.

OTHER PUBLICATIONS

Supan et al., Interactive Image Based Lighting in Augmented Reality, pp. 1-8, Jul. 8, 2019.
Frahm et al., Markerless Augmented Reality with Light Source Estimation for Direct Illumination, pp. 1-10, Jul. 8, 2019.
Internationanl Search Report dated Aug. 22, 2019, issued in the Internationanl Application No. PCT/KR2019/005625.

* cited by examiner

UNIT SPHERE

CUBE MAP PROJECTION

EQUIRECTANGULAR PROJECTION

METHOD FOR ESTIMATING LIGHT FOR AUGMENTED REALITY AND ELECTRONIC DEVICE THEREOF

CROSS-REFERENCE TO RELATED APPLICATION(S)

This application is based on and claims priority under 35 U.S.C. § 119(a) of a Greek patent application number 20180100194, filed on May 10, 2018, with the Greek Industrial Property Organisation and a United Kingdom patent application number 1900608.9, filed on Jan. 16, 2019, in the United Kingdom Intellectual Property Office, the disclosure of each of which is incorporated by reference herein in its entirety.

BACKGROUND

1. Field

The disclosure relates to rendering an augmented reality object. More particularly, the disclosure relates to methods and an apparatus for rendering an augmented reality object.

2. Description of Related Art

Augmented reality refers to a process whereby a computer-generated object is superimposed on a user's view of the real world, thus providing a composite view through which the user may view and interact with the object. To provide a more realistic composite view, it is necessary to closely match the appearance of the rendered object to the surrounding real-world environment. To this end, computer vision and computer graphics algorithms have been developed which attempt to estimate the lighting conditions in the real-world environment into which the rendered object is to be placed, to produce more convincing results. Existing light estimation techniques can be categorised into approximation techniques and extrapolation techniques.

Approximation techniques are those that record the environment using a chosen camera system, such as a red-green-blue (RGB) or RGB-depth (RGB-D) camera equipped with a rectilinear or fisheye lens, and approximate the lighting of the environment based solely on that information. These techniques tend to rely on certain assumptions, for example that diffuse light changes slowly over space.

Extrapolation techniques tend to infer the light in a certain environment from one or more images using machine learning algorithms that have been trained to estimate light under a number of conditions. The final result of these techniques depends on the quality of the training data and can often achieve a superior result to approximation techniques. However, drawbacks of extrapolation techniques include the extensive offline processing required to train a model, and the higher runtime cost in comparison to most approximation techniques.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for augmented reality rendering.

Additional aspects will be set forth in part in the description which follows and, in part, will be apparent from the description, or may be learned by practice of the presented embodiments.

According to some embodiments of the disclosure, a method for operating an electronic device for rendering an augmented reality object is provided. The method includes obtaining at least one first image of an environment in which an augmented reality virtual object is to be displayed, obtaining an environment texture based on the obtained at least one first image, identifying at least one light source in at least one second image by identifying at least one cluster including pixels with a brightness value greater than a threshold, determining a position of the at least one light source based on a position of the pixels within the at least one cluster, rendering the augmented reality virtual object based on the obtained environment texture and the determined position of the at least one light source, and displaying the rendered augmented reality virtual object on a display of the electronic device.

According to some embodiments of the disclosure, obtaining of the at least one first image of the environment includes obtaining a first rectilinear image and a second rectilinear image, and obtaining of the environment texture includes distorting the first rectilinear image and the second rectilinear image according to a spherical projection.

According to some embodiments of the disclosure, obtaining of the at least one first image of the environment includes obtaining an image obtained to be displayed on a display of the electronic device corresponding to a head mounted display (HMID) device, and obtaining of the environment texture includes distorting the obtained image.

According to some embodiments of the disclosure, identifying of the at least one light source includes setting a first value to first pixels in the at least one second image based on identifying that the brightness value of the first pixels is greater than the threshold, and setting a second value to second pixels in the at least one second image based upon identifying that the brightness value of the second pixels is less than the threshold.

According to some embodiments of the disclosure, determining of the position of the at least one light source includes identifying a geometrical center point of the pixels in each of the at least one cluster, and setting the geometrical center point to a position of the each of the at least one light source.

According to some embodiments of the disclosure, the method further includes determining relative intensities of two or more of the at least one light source based on a number of pixels in each of the at least one cluster, one light source corresponding to a cluster with more pixels being determined to have a higher intensity than another light source corresponding to a cluster with fewer pixels.

According to some embodiments of the disclosure, the at least one second image includes the environment texture obtained based on the at least one first image.

According to some embodiments of the disclosure, the method further includes obtaining the at least one second image based on a lower exposure setting than the at least one first image.

According to some embodiments of the disclosure, identifying of the at least one light source includes identifying a position of a light source that is present outside of the obtained image among light sources in the environment based on at least one of a direction of a shadow for an object in the obtained image, a size of the shadow, or the brightness value of pixels associated with the object other than the at least one light source.

According to some embodiments of the disclosure, an electronic device for rendering an augmented reality object is provided. The electronic device includes a display, an image sensor, at least one processor coupled to the display and the image sensor, and a memory coupled to the at least one processor. The memory includes instructions executable by the least one processor and configured to cause the at least one processor to obtain at least one first image of an environment in which an augmented reality virtual object is to be displayed by using the image sensor, identify at least one light source in at least one second image by identifying at least one cluster including pixels with a brightness value greater than a threshold, determine a position of the at least one light source based on a position of the pixels within the at least one cluster, render the augmented reality virtual object based on the obtained environment texture and the determined position of the at least one light source, and display the rendered augmented reality virtual object on the display.

According to some embodiments of the disclosure, to obtain the at least one first image of the environment, the at least one processor is further configured to obtain a first rectilinear image and a second rectilinear image by using the image sensor. And to obtain the environment texture, the at least one processor is further configured to distort the first rectilinear image and the second rectilinear image according to a spherical projection.

According to some embodiments of the disclosure, to obtain the at least one first image of the environment, the at least one processor is further configured to obtain an image obtained to be displayed on the display of the electronic device corresponding to a head mounted display (HMD) device, by using the image sensor. And to obtain the environment texture, the at least one processor is further configured to distort the obtained image.

According to some embodiments of the disclosure, in order to identify the at least one light source, the at least one processor is further configured to set a first value to first pixels in the at least one second image based on identifying that the brightness value of the first pixels is greater than the threshold, and set a second value to second pixels in the at least one second image based upon identifying that the brightness value of the second pixels is less than the threshold.

According to some embodiments of the disclosure, in order to determine the position of the at least one light source, the at least one processor is further configured to identify a geometrical center point of the pixels in each of the at least one cluster, and set the geometrical center point to a position of the each of the at least one light source.

According to some embodiments of the disclosure, the at least one processor is further configured to determine relative intensities of two or more of the at least one light source based on a number of pixels in each of the at least one cluster, and one light source corresponding to a cluster with more pixels being determined to have a higher intensity than another light source corresponding to a cluster with fewer pixels.

According to some embodiments of the disclosure, the at least one second image includes the environment texture obtained based on the at least one first image.

According to some embodiments of the disclosure, the at least one processor is further configured to obtain the at least one second image based on a lower exposure setting than the at least one first image.

According to some embodiments of the disclosure, in order to identify the at least one light source, the at least one processor is further configured to identify a position of a light source that is present outside of the obtained image among light sources in the environment based on at least one of a direction of a shadow for an object in the obtained image, a size of the shadow, or the brightness value of pixels associated with the object other than the at least one light source.

According to some embodiments of the disclosure, a computer program product is provided. The computer program product including computer program instructions which, when executed, perform a method including obtaining at least one first image of an environment in which an augmented reality virtual object is to be displayed, obtaining an environment texture based on the obtained at least one first image, identifying at least one light source in at least one second image by identifying at least one cluster including pixels with a brightness value greater than a threshold, determining a position of the at least one light source based on a position of the pixels within the at least one cluster, rendering the augmented reality virtual object based on the obtained environment texture and the determined position of the at least one light source, and displaying the rendered augmented reality virtual object on a display of an electronic device.

According to some embodiments of the disclosure, at least one non-transitory computer readable storage medium arranged to store a computer program product is provided. The computer program product including computer program instructions which, when executed, perform a method including obtaining at least one first image of an environment in which an augmented reality virtual object is to be displayed, obtaining an environment texture based on the obtained at least one first image, identifying at least one light source in at least one second image by identifying at least one cluster including pixels with a brightness value greater than a threshold, determining a position of the at least one light source based on a position of the pixels within the at least one cluster, rendering the augmented reality virtual object based on the obtained environment texture and the determined position of the at least one light source, and displaying the rendered augmented reality virtual object on a display of an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
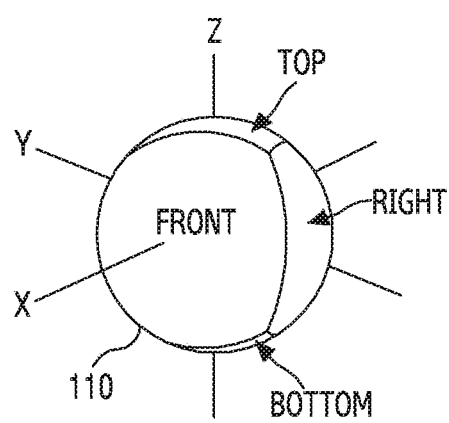
FIG. 1 illustrates equivalent two-dimensional (2D) representations of a spherical field of view according to an embodiment of the disclosure.
Figure 1:
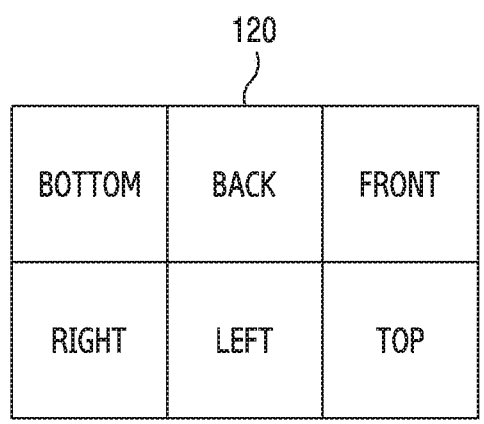
Figure 1:
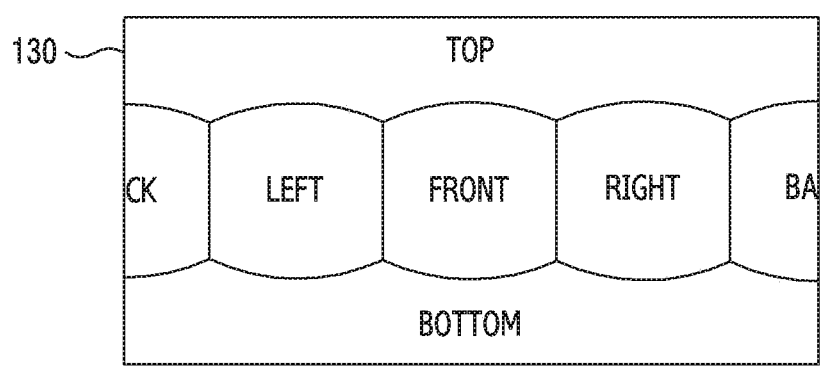

FIG. 1 illustrates equivalent two-dimensional (2D) representations of a spherical field of view according to an embodiment of the disclosure.

Referring to FIG. 1, an augmented reality object may be rendered based on an environment texture that represents the environment surrounding the object. The environment texture can represent a spherical field of view centered on the user's current location. The environment texture may be stored in various formats, as shown in FIG. 1, which illustrates equivalent 2D representations of a spherical field of view according to an embodiment of the disclosure. A spherical field of view, which may also be referred to as a 360 degree field of view, can be divided into front, back, top, bottom, left and right fields of view.

In a unit sphere representation, pixels of image data are indexed in a three-dimensional coordinate system which defines the location of each pixel on the surface of a virtual sphere 110. Image data for a spherical field of view may also be represented in various 2D formats, for example a cube map projection 120 and an equirectangular projection 130. In a cube map projection 120, pixel data for each face of a virtual cube may be stored as a 2D image spanning a 90°×90° field of view. In an equirectangular projection 130, pixel data is stored as a single 2D image spanning a 360°×180° field of view. In FIG. 1, the labels 'top', 'bottom', 'front', 'back', 'left' and 'right' indicate corresponding regions of the pixel data in each of the equivalent projections.

Figure 2:
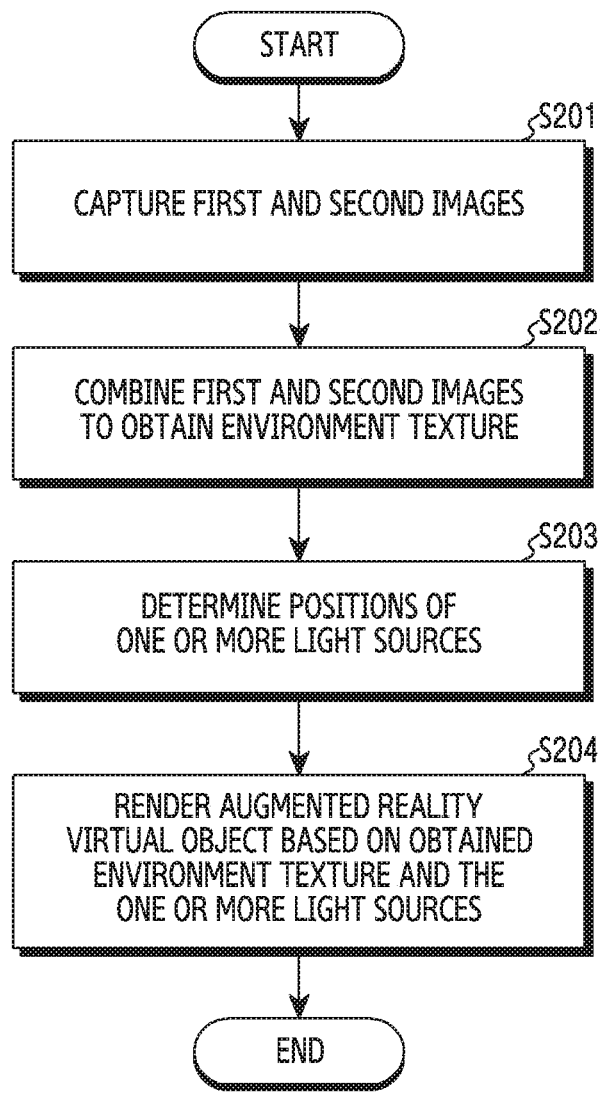
FIG. 2 is a flowchart illustrating a method of rendering an augmented reality object according to an embodiment of the disclosure.

FIG. 2 is a flowchart illustrating a method of rendering an augmented reality object according to an embodiment of the disclosure.

Referring to FIG. 2, at operation S201, the electronic device may capture a first image and a second image of an environment in which an augmented reality virtual object is to be displayed. In an embodiment of the disclosure, the first image may be captured using a front-facing camera of the electronic device and the second image may be captured using a rear-facing camera of the electronic device. For example, since many modern electronic devices, such as smartphone or tablet computers, include both front- and rear-facing cameras, the first image and the second image may therefore be obtained using hardware that is commonly found in electronic devices. However, any image capture device may be used to capture the first image and/or the second image.

Next, at operation S202, the electronic device may combine the first image and the second image to obtain an environment texture. In an embodiment of the disclosure, when the first and second images are captured from both the front-facing and rear-facing cameras, the images can be combined to obtain a relatively complete environment texture. For example, since most parts of the surrounding environment will be visible to either the front or the rear camera (e.g., within the field of view), the first and second images may capture the surrounding environment such that the environment surrounding the electronic device may be represented in the obtained environment texture.

At operation S203, the electronic device may determine the position of one or more light sources associated with the environment surrounding the electronic device. For example, the positions of light sources within the environment may be determined by analyzing an image of the environment to detect or identify one or more light sources. According to an embodiment of the disclosure, the position of one or more light sources may be determined by analyzing the same images used to obtain the environment texture (e.g., the first image and the second image), or by analyzing other images of the environment.

At operation S204, the electronic device may render the augmented reality virtual object based on the obtained environment texture and the determined position of the one or more light sources. By taking into account both the surrounding environment texture and the position of the one or more light sources, the object can be rendered in a more convincing manner, such that the appearance of the rendered object closely matches the actual lighting conditions in the current environment that surrounds the electronic device. In an embodiment of the disclosure, the rendered augmented reality virtual object can then be combined with an image of the environment surrounding the electronic device to obtain a composite image which includes the rendered object. In some embodiments of the disclosure, the electronic device may be further configured to display the obtained composite image.

According to an embodiment of the disclosure, an electronic device may operate as a head mounted display (HMD) device. The electronic device may obtain an image including a region among the environment that is displayed on a head up display (HUD). The electronic device may obtain an environment texture from the obtained image that is displayed on the HUD. The electronic device may determine the position of the one or more light sources based on the obtained image. For example, the position and/or a main direction of the light sources may be determined based on parameters related to one or more light sources that are identified as being present in the obtained image, such as a brightness value associated with each of the light sources, a size of each of the light sources, etc. Furthermore, the positions of the light sources that are not directly present within the obtained image among light sources existing in the environment are determined based on the following parameters. For example, by identifying a direction of a shadow for an object other than a light source in the obtained image, a size of the shadow, and/or a brightness of the object, the position, the size, and/or the brightness of the one or more light sources that are not present in the obtained image may be identified. Moreover, the color of each of the light sources that are in the obtained image and that are not present in the obtained image may be identified together while identifying the parameters described above. The electronic device may render an augmented reality virtual object based on the obtained environment texture and the one or more light sources that are identified based on the position, direction, brightness, and/or color associated with each light source.

A method of combining images to obtain an environment texture will now be described with reference to FIGS. 3 to 6.

Figure 3:
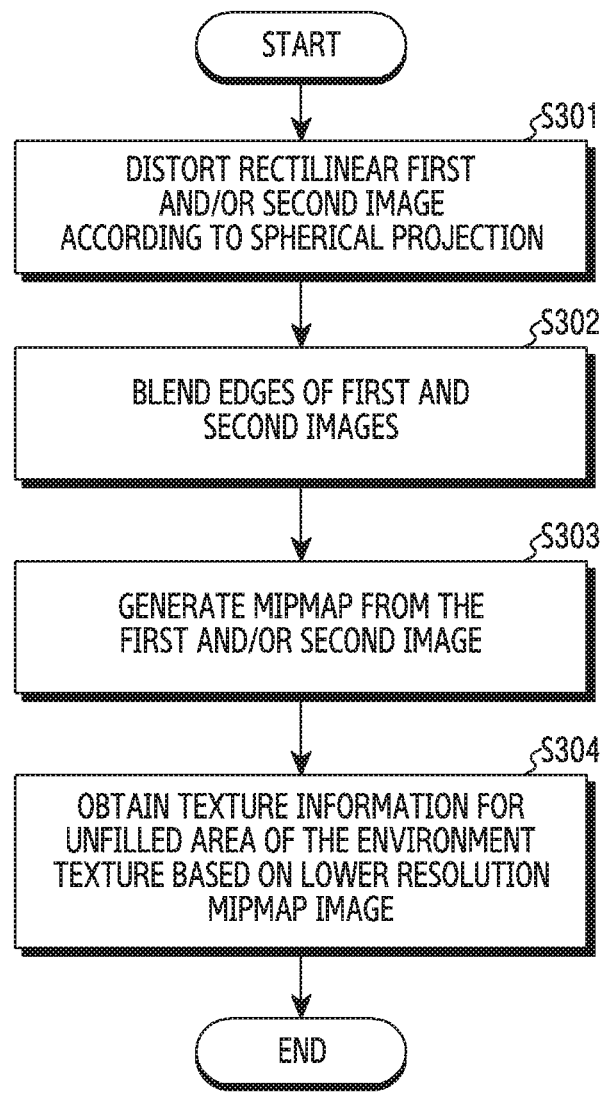
FIG. 3 is a flowchart illustrating a method of combining images to obtain an environment texture according to an embodiment of the disclosure.

FIG. 3 is a flowchart illustrating a method of combining images to obtain an environment texture according to an embodiment of the disclosure. While the description of FIGS. 3 to 6 refer to the images being captured using a front-facing camera and rear-facing camera of an electronic device, the images may be captured using any image capture device.

In an embodiment of the disclosure, the method illustrated in FIG. 3 may be used at operation S202 of FIG. 2. In another embodiment of the disclosure, an electronic device (e.g., electronic device 800) may perform the method of combining the images to obtain the environment texture.

Figure 4:
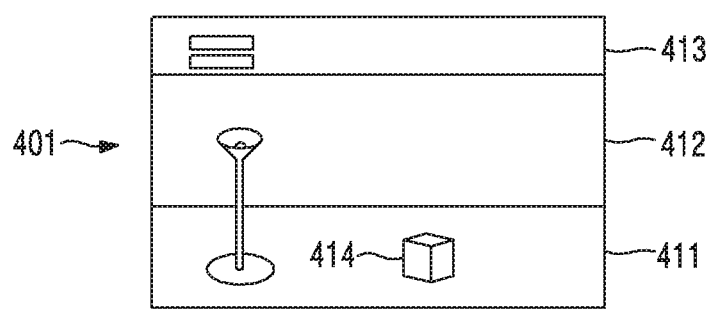
FIG. 4 schematically illustrates a first captured image captured according to an embodiment of the disclosure.

FIG. 4 schematically illustrates a first image captured using a front-facing camera according to an embodiment of the disclosure.

Figure 5:
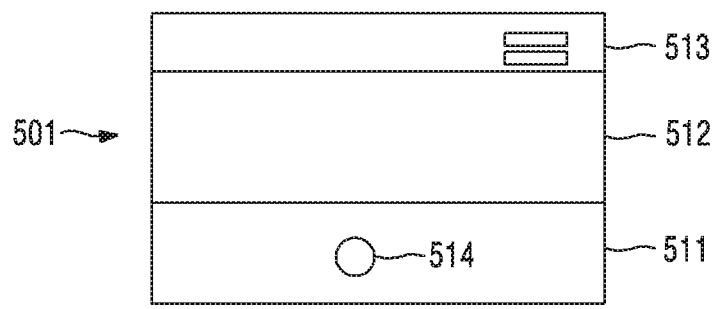
FIG. 5 schematically illustrates a second captured image captured according to an embodiment of the disclosure.

FIG. 5 schematically illustrates a second image captured using a rear-facing camera according to an embodiment of the disclosure.

Figure 6:
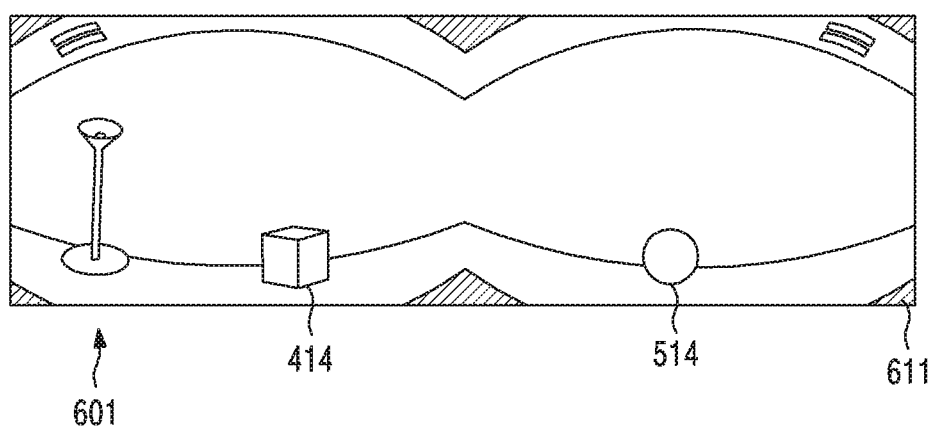
FIG. 6 schematically illustrates an environment texture obtained by combining first and second images according to an embodiment of the disclosure.

FIG. 6 schematically illustrates an environment texture obtained by combining first and second images according to an embodiment of the disclosure.

As described above, the first image and the second image may be captured using the front- and rear-facing cameras in the electronic device. In some electronic devices, one or both of the front- and rear-facing cameras may be capable of capturing a full 180 degree field of view, for example using a suitable wide angle lens such as a fisheye lens. In such embodiments the resulting image may be directly copied into an equirectangular environment texture with little or no post-processing.

However, in many electronic devices, the front- and rear-facing cameras may only be capable of capturing rectilinear images, such that one or both of the first and second images may be a rectilinear image. For example, the integrated cameras in many smartphones are equipped with rectilinear lenses, meaning that light is captured onto a planar surface. Examples of a first rectilinear image 401 and a second rectilinear image 501 are illustrated in FIGS. 4 and 5. Referring to FIG. 4, the first image 401 is a rectilinear image of an indoor environment captured with a front-facing camera. The first image 401 includes a floor 411, wall 412, ceiling 413, and a first foreground object 414. Referring to FIG. 5, the second image 501 is a rectilinear image of the same indoor environment captured with a rear-facing camera. The second image 501 includes the floor 511, wall 512, ceiling 513, and a second foreground object 514. Since the rectilinear images include a less than 180 degree field of view, different areas of the floor 411, 511, walls 412, 512 and ceiling 413, 513 are visible in each image 401, 501.

In some embodiments in which one or both of the first image and second image is a rectilinear image, post-processing may be applied to the rectilinear image when generating the environment texture. The post-processing operations can compensate for the fact that the as-captured first and second images are not in the correct format for use in a 360 degree environment texture, and can estimate texture information for areas of the environment that are not visible in either the first image or second image.

Referring to FIG. 3, at operation S301, the electronic device may distort a rectilinear first image 401 and/or a rectilinear second image 501 according to a spherical projection. FIG. 6 illustrates an example of an equirectangular environment texture 601 obtained by combining distorted versions of the rectilinear first image and second image 401 and 501 of FIGS. 5 and 6, respectively. In some embodiments in which one of the first and second images includes a 180 degree field of view, for example a fisheye image, the distortion may only need to be applied to the other one of the first and second images, i.e., a rectilinear one of the first and second images. The distortion applied at operation S301 may be configured so as to project the rectilinear images 401 and 501 onto the surface of a virtual sphere that surrounds the user. For example, a sphere centered on the electronic device used to capture the first image 401 and the second image 501. The distorted images 401 and 501 are then stitched side by side to obtain an approximation of an equirectangular environment texture 601 as shown in FIG. 6.

At operation S302, the electronic device may blend edges of the first image and the second image. The adjacent edges of the first and second images 401, 501 used to create the environment texture are blended by mixing information from both images. Specifically, the distorted first and second images 401, 501 are arranged side-by-side in the equirectangular environment texture, and information from both images is mixed in the vertical regions at either side of the environment texture 601 and along the vertical center line, where the two images 401, 501 meet. Since the first and second images 401, 501 each cover a field of view smaller than 180 degrees, stitching the images side-by-side without blending may result in discontinuity due to a blind spot between the images, depending on the scene captured within the images. Blending the adjacent edges of the first and second images 401, 501 can help to soften the transition between the images 401, 501 and reduce the prominence of visual artifacts due to discontinuities.

At operation S303, the electronic device may generate a mipmap from the first image and/or the second image. At operation S304, the electronic device may obtain texture information for an unfilled area of the environment texture based on a lower resolution mipmap image.

Referring to FIG. 6, the approximate equirectangular environment texture 601 may include a plurality of unfilled areas 611 near the corners of the distorted first and second images 401 and 501. In FIG. 6, the plurality of unfilled areas 611 are shown using hatched shading. The plurality of unfilled areas 611 arise because the distorted first and second images only partially fill the respective corresponding areas of the environment texture. This occurs because the equirectangular environment texture 601 represents a full 360 degree field of view, whereas the field of view of each rectilinear image 401, 501 is less than 180 degrees. The plurality of unfilled areas 611 in FIG. 6 therefore constitute blind spots in the environment which are not currently visible to either the front-facing camera or the rear-facing camera.

According to an embodiment of the disclosure, the missing texture information for the plurality of unfilled area 611 of the environment texture 601 is estimated based on a lower-resolution version of one of the first and second images 401, 501. For example, referring to FIG. 6, the texture information for the plurality of unfilled area 611 at the lower right-hand corner of the equirectangular environment texture 601 may be estimated from a lower resolution version of the second image 501. In the present embodiment a mipmap comprising a plurality of lower-resolution versions is generated from each of the first and second images 401, 501. In a mipmap, each version of the original image may have a height and width that is half that of the image in the previous mipmap level.

The lower-resolution version may be scaled up to a size larger than the original image, and the same distortion may then be applied to the upscaled low-resolution image. By increasing the size of the image, the distorted low-resolution version is larger than the distorted original and so objects within the image occupy a larger area of the environment texture 601, including the plurality of unfilled area 611. Pixel data from the distorted low-resolution version can then be used to fill in the missing texture information in the plurality of unfilled area 611, which as explained above is an area not filled by the original distorted image.

Using an upscaled low-resolution version of the original image 401, 501 to fill in the missing texture information has the effect of blurring out features in the plurality of unfilled areas 611. However, in an equirectangular projection, objects near the top and bottom of the field of view appear stretched and elongated relative to objects closer to the horizontal center line. Therefore, using an upscaled low-resolution version can mimic the distortion that would naturally occur in an equirectangular projection. Furthermore, the loss of spatial information in the plurality of unfilled areas 611 may not have a noticeable impact on the final rendering product, since texture information further from the central axis will automatically be compressed during the rendering process.

According to an embodiment of the disclosure, obtaining the unfilled texture information may comprise obtaining texture information for a plurality of unfilled areas at different distances from a center of the distorted first and/or second image 401, 501, based on a plurality of lower-resolution versions of the respective first or second image 401, 501. For example, when mipmaps are used, the images for different mipmap levels may be used to estimate the missing texture information at different distances from the center of the image. The resolution of the version that is used to obtain the texture information may progressively decrease as the distance from the center increases.

Although mipmaps are used in an embodiment of the disclosure, according to an embodiment of the disclosure, the first or second image 401, 501 may be converted to any arbitrary lower resolution for use in obtaining missing texture information, instead of generating a mipmap.

According to an embodiment of the disclosure, the electronic device may operate as an HMD. The electronic device may obtain an image including a region among the environment that is displayed on an HUD. To obtain the environment texture, the electronic device may perform operations described in FIG. 3 by using the single image obtained to be displayed on the HUD. According to an embodiment of the disclosure, the operation S302 may be omitted.

Figure 7:
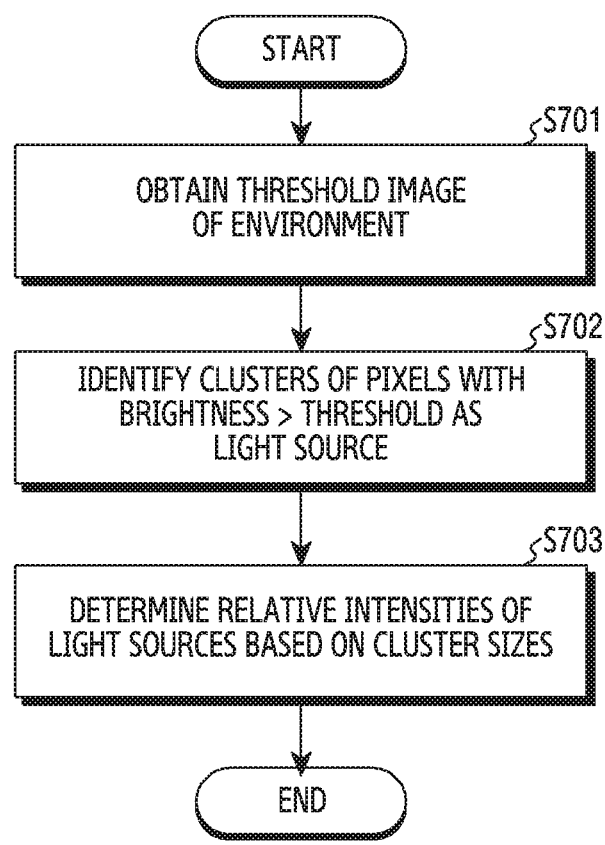
FIG. 7 is a flowchart illustrating a method of determining positions of one or more light sources according to an embodiment of the disclosure.

FIG. 7 is a flowchart illustrating a method of determining positions of one or more light sources according to an embodiment of the disclosure. The flowchart illustrated in FIG. 7 is an example of one method that may be used at operation S203 of FIG. 2.

Referring to FIG. 7, at operation S701, the electronic device may obtain a threshold image of an environment. For example, to obtain the threshold image of the environment, thresholding may be applied to an image of the environment. Here, thresholding refers to a process whereby pixels in an original image are set to have one of two values based on a threshold brightness value (e.g., to create a binary image). For example, if the brightness value of the pixel in the original image falls below a certain threshold, the pixel may be assigned as a black pixel. Conversely, if the brightness value of the pixel in the original image falls above the threshold, the pixel may be assigned as a white pixel. In an embodiment of the disclosure, if the original image is a color image, then the image may first be converted to grayscale before applying thresholding.

In an embodiment of the disclosure, the threshold may be a fixed threshold which is applied in all situations. However, a fixed threshold does not take into account the actual lighting levels in the current environment, and may miss light sources or produce false positives. In another embodiment of the disclosure, an adaptive threshold may be used, for example by using Otsu's method to process the full image to find an appropriate threshold value based on the color characteristics of the image.

According to an embodiment of the disclosure, a blurring filter is applied to the image before thresholding. Blurring the input image removes high frequencies, and makes it easier to detect light sources by enlarging each light source in the blurred image. Blurring can also result in multiple closely-spaced light sources being merged into a single pixel cluster. This in turn can allow the group of closely-spaced light sources to be modelled as a single light source, which can still provide an acceptable approximation in terms of the final output image whilst simplifying the rendering process.

Figure 9:
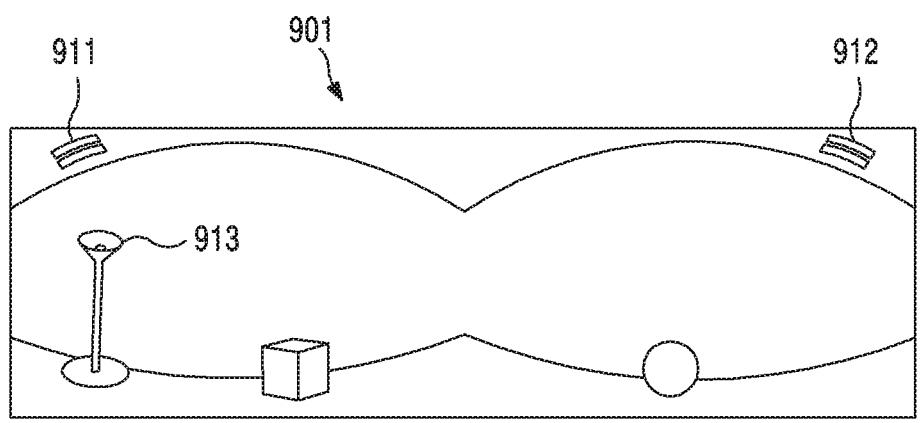
FIG. 9 illustrates an image of an environment comprising a plurality of light sources according to an embodiment of the disclosure.
Figure 10:
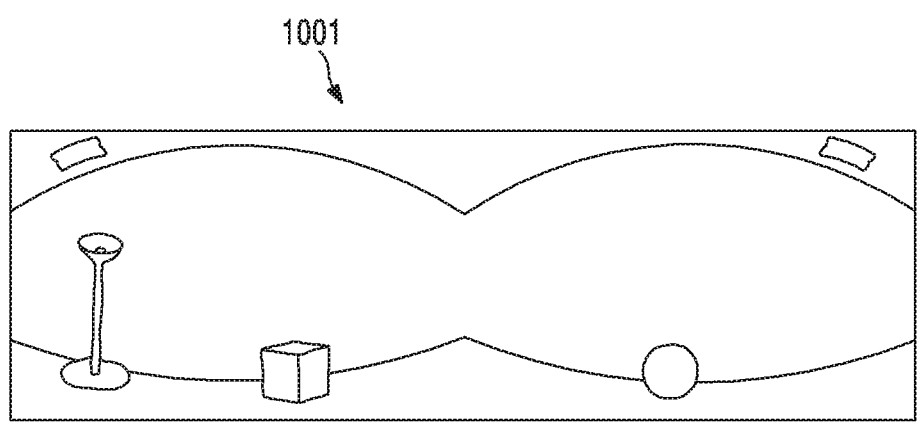
FIG. 10 illustrates an image of an environment comprising a plurality of light sources after blurring according to an embodiment of the disclosure.
Figure 11:
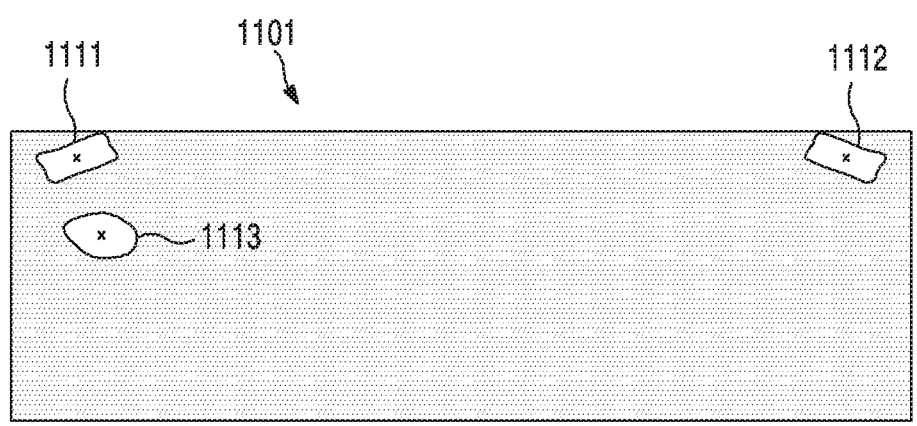
FIG. 11 illustrates an image of an environment comprising a plurality of light sources after thresholding according to an embodiment of the disclosure.

FIG. 9 illustrates an image of an environment comprising a plurality of light sources according to an embodiment of the disclosure. FIG. 10 illustrates an image of an environment comprising a plurality of light sources after blurring according to an embodiment of the disclosure, and FIG. 11 illustrates an image of an environment comprising a plurality of light sources after thresholding according to an embodiment of the disclosure.

Referring to FIG. 9, an environment 901 may include a plurality of light sources 911, 912, and 913. In an embodiment of the disclosure, each of the plurality of light sources 911, 912, 913 may be associated with a location or position and/or intensity or brightness level.

Referring to FIG. 10, a blurred image 1001 may be obtained by blurring an image of an environment comprising a plurality of light sources such as image 901 of FIG. 9. Referring to FIG. 11, an image 1101 may be obtained by applying thresholding to a blurred image of an environment comprising a plurality of light sources such as image 1001 of FIG. 10.

Referring to FIG. 7, at operation S702, the electronic device may identify clusters of pixels which have brightness values greater than the applied threshold as a light source. According to an embodiment of the disclosure, a separate light source may be defined for each cluster, or a plurality of closely-spaced clusters may be merged into a single light source to simplify the rendering process. Each light source can be assigned spatial coordinates based on the location of the corresponding cluster in the image. For example, the geometrical center of the bright pixels in each cluster is used as the location of the corresponding light source 1111, 1112, 1113 as shown in FIG. 11.

At operation S703, the electronic device may determine the relative intensities of the light sources based on the cluster sizes. According to an embodiment of the disclosure, the relative intensities of two or more light sources are determined based on the number of pixels associated with in the corresponding cluster for each of the light sources. A light source corresponding to a cluster with more pixels is determined to have a higher intensity than a light source corresponding to a cluster with fewer pixels, such that a brighter light source will produce a larger cluster of bright pixels in the threshold image. According to an embodiment of the disclosure, each light source may be set to have the same default brightness value. This may provide an acceptable approximation, particularly in environments in which lighting levels are reasonably constant throughout the scene.

According to an embodiment of the disclosure, at least one of directions or colors of the light sources may be identified by using images obtained separately from the images used to identify the positions of the light sources.

According to an embodiment of the disclosure, the image that is used to detect light sources in the method of FIG. 7 may be the environment texture that was obtained at operation S202 of FIG. 2. For example, the first and second images 401, 501 that were used to obtain the environment texture 601 may be captured using a balanced exposure value that is appropriate for the current environment, which may be automatically calculated by the camera or may be manually set by the user.

According to an embodiment of the disclosure, the light sources may be detected from a different image of the environment. For example, the image used for light source detection at operation S203 of FIG. 2 may be an image of the environment which is captured at a lower exposure setting to the first and second images 401, 501. Using a lower exposure value has the effect of darkening the image, making it easier to isolate and detect individual light sources. For example, third and fourth images may be captured at a lower exposure setting using the front- and rear-facing cameras, and may then be distorted and combined using a similar method to the one described above with reference to FIGS. 3 to 6 to obtain a low-exposure image of the environment in an equirectangular image format.

According to an embodiment of the disclosure, the electronic device may operate as an HMD. The electronic device may obtain an image including a region among the environment that is displayed on an HUD. The electronic device may obtain an environment texture from the obtained image that is displayed on the HUD. The electronic device may determine the positions of the one or more light sources based on the obtained image. For example, the positions and/or a main direction of the light sources are determined based on parameters related to one or more light sources that are identified directly in the obtained image, such as a brightness of each of the light sources, a size of each of the light sources, and the like. Furthermore, the positions of the light sources that are not present in the obtained image among light sources existing in the environment are determined based on the following parameters. For example, by identifying a direction of a shadow for an object in the obtained image, a size of the shadow, and/or a brightness of the object, the positions, the sizes, and/or the brightness of the light sources that are not present in the obtained image may be identified. Moreover, the color of each of the light sources that are in the obtained image and that are not present in the obtained image is identified together while identifying the parameters described above. The electronic device may render an augmented reality virtual object based on the obtained environment texture and the one or more light sources that the positions, directions, brightness, and/or colors are identified. According to an embodiment of the disclosure, at least one of directions or colors of the light sources may be identified by using a single image obtained separately from the image used to identify the positions of the light sources.

Figure 8:
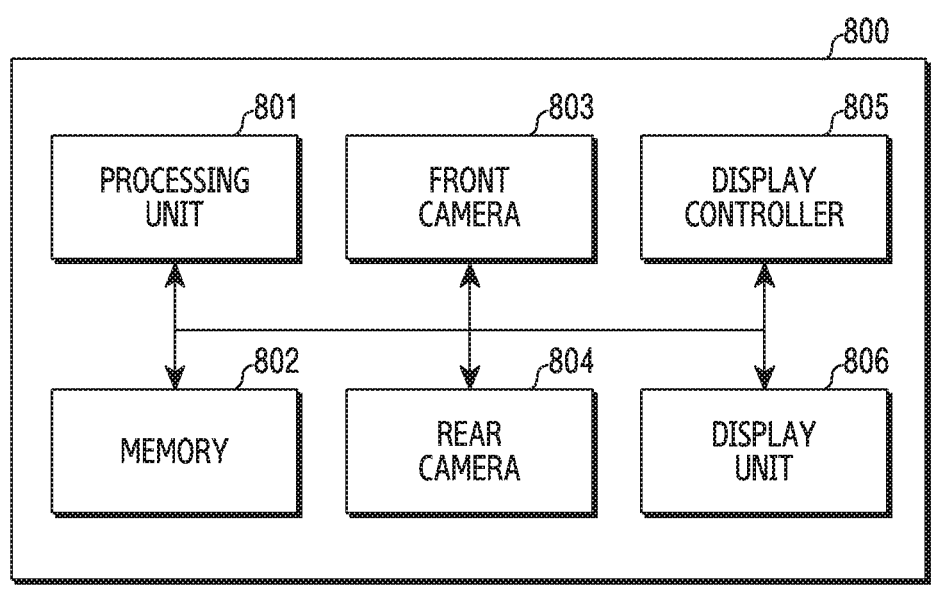
FIG. 8 schematically illustrates an apparatus for rendering an augmented reality object according to an embodiment of the disclosure.

FIG. 8 schematically illustrates an electronic device for rendering an augmented reality object according to an embodiment of the disclosure. The apparatus may be configured to perform any of the methods disclosed herein, for example the methods described above with reference to FIGS. 2, 3, and 7.

Referring to FIG. 8, an electronic device 800 comprises a processing unit 801 for executing computer program instructions, and a memory 802 arranged to store computer program instructions. The memory 802 can comprise any suitable computer-readable storage medium capable of storing a computer program product which includes computer program instructions for execution by the processing unit 801. When executed by the processing unit 801, the computer program instructions may cause the electronic device 800 to perform any of the methods disclosed herein.

According to an embodiment of the disclosure, the electronic device 800 further includes the front-facing camera 803, the rear-facing camera 804, a display controller 805 and a display unit 806. For example, the electronic device 800 may be embodied as a smartphone, tablet computer or other electronic device which includes the front- and rear-facing cameras 803, 804 and a suitable display unit 806. The display controller 805 is configured to control the display unit 806 to display a composite image which includes the rendered augmented reality virtual object.

Although not illustrated in FIG. 8, the electronic device 800 further includes one or more sensors that can measure a physical quantity or detect an activation state of the electronic device 800 and convert measured or detected information into an electrical signal. For example, a sensor can include a depth or distance sensor, a color sensor (e.g., a red-green-blue (RGB) sensor), and the like. The sensor(s) can further include a control circuit for controlling at least one of the sensors included therein. Any of these sensor(s) can be located within the electronic device 800.

According to an embodiment of the disclosure, the electronic device 800 may be mounted in a wearable device. For example, the electronic device 800 may operate, e.g., as an HMD, and run an augmented reality mode.

According to an embodiment of the disclosure, the processing unit 801 and the memory 802 may be embodied in a separate physical device to one or more of the front-facing camera 803, rear-facing camera 804, display controller 805 and display unit 806. For example, the processing unit 801 and the memory 802 may be embodied as a server arranged to communicate remotely with the electronic device comprising the front-facing camera 803, rear-facing camera 804, display controller 805 and display unit 806, such that the processes of obtaining the environment texture, determining the light sources and/or rendering the augmented reality virtual object can be carried out remotely. Remote processing may be advantageous when the electronic device itself only has limited processing power. According to an embodiment of the disclosure, the composite image may be output to a physically separate display unit, in which case the electronic device 800 need not include a display unit 806.

According to an embodiment of the disclosure, an environment texture is obtained based on images captured using the front-facing and rear-facing cameras of the electronic device. The environment texture is then used when rendering an augmented reality virtual object. This approach provides a computationally efficient solution which does not require any input or parameterization from the user before execution, and which is suitable for implementing using electronic device hardware of the related art. The processing described above may therefore be performed substantially in real-time, allowing the augmented reality rendering process to take into account dynamic changes in lighting conditions.

While the disclosure has been shown and described with reference to the various embodiments thereof, it will be understood by those skilled in the art that various changes in form and details may be made there in without departing from the spirit and the scope of the disclosure as defined by the appended claims and their equivalents.

What is claimed is:

1. A method for operating an electronic device for rendering an augmented reality object, the method comprising:
   obtaining at least one first image of an environment in which an augmented reality virtual object is to be displayed;
   obtaining an environment texture based on the obtained at least one first image;
   identifying at least one cluster comprising pixels with a brightness value greater than a threshold in at least one second image;
   determining a position of at least one light source in the at least one second image based on a position of the pixels within the at least one cluster;
   rendering the augmented reality virtual object based on the obtained environment texture and the determined position of the at least one light source; and
   displaying the rendered augmented reality virtual object on a display of the electronic device.

2. The method of claim 1,
   wherein the obtaining of the at least one first image of the environment comprises obtaining a first rectilinear image and a second rectilinear image, and
   wherein the obtaining of the environment texture comprises distorting the first rectilinear image and the second rectilinear image according to a spherical projection.

3. The method of claim 1,
   wherein the obtaining of the at least one first image of the environment comprises obtaining an image to be displayed on a display of the electronic device corresponding to a head mounted display (HMD) device, and
   wherein the obtaining of the environment texture comprises distorting the obtained image.

4. The method of claim 3, wherein the determining of the position of the at least one light source comprises identifying a position of a light source that is present outside of the obtained image among light sources in the environment based on at least one of:
   a direction of a shadow for an object in the obtained image,
   a size of the shadow, or
   a brightness value of pixels associated with the object other than the at least one light source.

5. The method of claim 1, wherein the determining of the position of the at least one light source comprises:
   setting a first value to first pixels in the at least one second image based on identifying that the brightness value of the first pixels is greater than the threshold; and
   setting a second value to second pixels in the at least one second image based upon identifying that the brightness value of the second pixels is less than the threshold.

6. The method of claim 1, wherein the determining of the position of the at least one light source comprises:
   identifying a geometrical center point of the pixels in each of the at least one cluster; and
   setting the geometrical center point to a position of the each of the at least one light source.

7. The method of claim 1, further comprising:
   determining relative intensities of two or more of the at least one light source based on a number of pixels in each of the at least one cluster,
   wherein one light source corresponding to a cluster with more pixels is determined to have a higher intensity than another light source corresponding to a cluster with fewer pixels.

8. The method of claim 1, wherein the at least one second image comprises the environment texture obtained based on the at least one first image.

9. The method of claim 1, further comprising:
   obtaining the at least one second image based on a lower exposure setting than the at least one first image.

10. An electronic device for rendering an augmented reality object, the electronic device comprising:
    a display;
    an image sensor;
    at least one processor coupled to the display and the image sensor; and
    a memory coupled to the at least one processor, the memory including instructions executable by the least one processor and configured to cause the at least one processor to:
    obtain at least one first image of an environment in which an augmented reality virtual object is to be displayed by using the image sensor,
    identify at least one cluster comprising pixels with a brightness value greater than a threshold in at least one second image, determine a position of at least one light source in the at least one second image based on a position of the pixels within the at least one cluster, render the augmented reality virtual object based on an environment texture of the at least one first image and the determined position of the at least one light source, and display the rendered augmented reality virtual object on the display.

11. The electronic device of claim 10, wherein, to obtain the at least one first image of the environment, the at least one processor is further configured to obtain a first rectilinear image and a second rectilinear image by using the image sensor, and wherein, to obtain the environment texture, the at least one processor is further configured to distort the first rectilinear image and the second rectilinear image according to a spherical projection.

12. The electronic device of claim 10, wherein, to obtain the at least one first image of the environment, the at least one processor is further configured to obtain an image to be displayed on the display of the electronic device corresponding to a head mounted display (HMD) device, by using the image sensor, and wherein, to obtain the environment texture, the at least one processor is further configured to distort the obtained image.

13. The electronic device of claim 12, wherein, in order to determine the position of the at least one light source, the at least one processor is further configured to identify a position of a light source that is present outside of the obtained image among light sources in the environment based on at least one of:

a direction of a shadow for an object in the obtained image, a size of the shadow, or a brightness value of pixels associated with the object other than the at least one light source.

14. The electronic device of claim 10, wherein, in order to determine the position of the at least one light source, the at least one processor is further configured to:

set a first value to first pixels in the at least one second image based on identifying that the brightness value of the first pixels is greater than the threshold, and set a second value to second pixels in the at least one second image based upon identifying that the brightness value of the second pixels is less than the threshold.

15. The electronic device of claim 10, wherein, in order to determine the position of the at least one light source, the at least one processor is further configured to:

identify a geometrical center point of the pixels in each of the at least one cluster, and set the geometrical center point to a position of the each of the at least one light source.

16. The electronic device of claim 10, wherein the at least one processor is further configured to determine relative intensities of two or more of the at least one light source based on a number of pixels in each of the at least one cluster, and wherein one light source corresponding to a cluster with more pixels is determined to have a higher intensity than another light source corresponding to a cluster with fewer pixels.

17. The electronic device of claim 10, wherein the at least one second image comprises the environment texture obtained based on the at least one first image.

18. The electronic device of claim 10, wherein the at least one processor is further configured to obtain the at least one second image based on a lower exposure setting than the at least one first image.

19. A computer program product comprising computer program instructions which, when executed, perform a method comprising:

obtaining at least one first image of an environment in which an augmented reality virtual object is to be displayed;

obtaining an environment texture based on the obtained at least one first image;

identifying at least one cluster comprising pixels with a brightness value greater than a threshold in at least one second image;

determining a position of at least one light source in the at least one second image based on a position of the pixels within the at least one cluster;

rendering the augmented reality virtual object based on the obtained environment texture and the determined position of the at least one light source; and displaying the rendered augmented reality virtual object on a display of an electronic device.

20. At least one non-transitory computer readable storage medium arranged to store a computer program product, the computer program product comprising computer program instructions which, when executed, perform a method comprising:

obtaining at least one first image of an environment in which an augmented reality virtual object is to be displayed;

obtaining an environment texture based on the obtained at least one first image;

identifying at least one cluster comprising pixels with a brightness value greater than a threshold in at least one second image;

determining a position of at least one light source in the at least one second image based on a position of the pixels within the at least one cluster;

rendering the augmented reality virtual object based on an environment texture of the at least one first image and the determined position of the at least one light source; and displaying the rendered augmented reality virtual object on a display of an electronic device.

* * * * *